No. 796,297. PATENTED AUG. 1, 1905.
F. B. COOK.
AUTOMATIC RESTORING THERMAL PROTECTOR.
APPLICATION FILED DEC. 9, 1904.
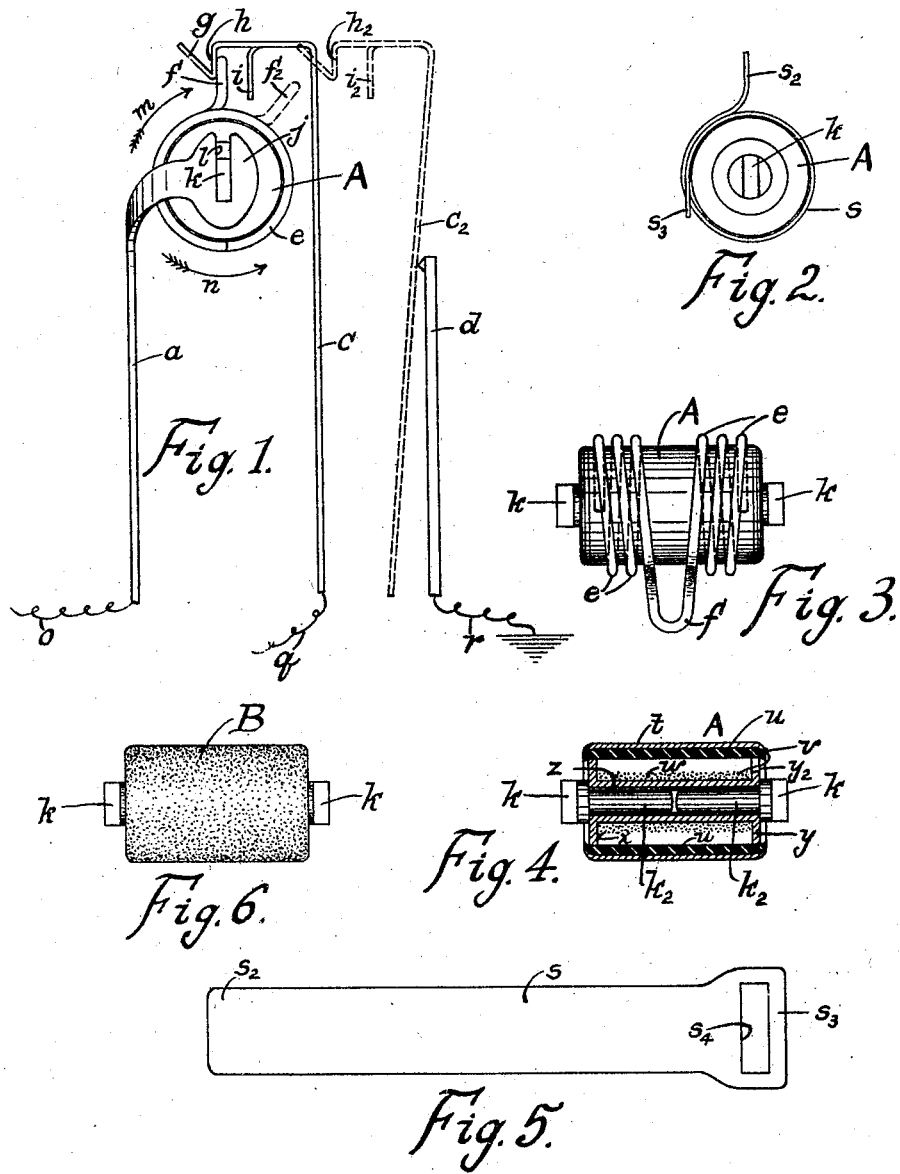
WITNESSES:
Frederick R. Parker.
Pursell E. Teets.
INVENTOR:
Frank B. Cook.

UNITED STATES PATENT OFFICE.

FRANK B. COOK, OF CHICAGO, ILLINOIS.

AUTOMATIC RESTORING THERMAL PROTECTOR.

No. 796,297.  Specification of Letters Patent.  Patented Aug. 1, 1905.

Application filed December 9, 1904. Serial No. 236,184.

*To all whom it may concern:*

Be it known that I, FRANK B. COOK, a citizen of the United States, residing at Chicago, in the county of Cook and State of Illinois, have invented new and useful Improvements in Automatic Restoring Thermal Protectors, of which the following is a specification, reference being had to the accompanying drawings, forming a part thereof.

My invention relates to thermal cut-outs for electric circuits, my object being, first, to provide such a cut-out or protector for use in connection with various electric circuits which automatically restores itself to operative condition upon the operation of same; second, to provide suitable means whereby the said protector may be readily restored to operative position after operation, and, third, to provide a compact and durable arrangement for the parts of such apparatus, which may be readily and economically manufactured.

Thermal cut-outs, or more particularly heat-coils, generally in use in telephone central stations to protect the incoming lines from stray electric currents of such a nature that a steady flow thereof heats the central-station apparatus abnormally, and which currents are not intended for use in the said lines, are of such a design that certain members thereof are separated by the action of a circuit-controlling means when the heat-coil is heated abnormally, thus allowing the said members to be separated, the said members remaining in a separated relation after the operation of the device. Some of the more recent heat-coils embody an arrangement the parts of which are automatically restored to their same relative operative condition after the operation of same, and others embody an arrangement which is automatically restored to a new operative position by the operation thereof. These heat-coils are of the self-soldering type.

The heat-coil constituting my present invention is of the self-soldering type, but is of a type distinctly different from any of the above. It is not automatically restored to a new operative position by the operation thereof, nor are the parts thereof automatically restored to their same relative operative condition. The parts of this heat-coil are automatically restored to a new relative operative condition upon the operation of the device, the latter being manually restored to an operative position through the agency of an automatic means.

The thermal protector of this present invention is an improvement upon my invention shown, described, and claimed in my copending application for Letters Patent on a self-soldering heat-coil, filed March 9, 1904, Serial No. 197,294.

In this present invention I provide a stationary axis upon which are normally secured the other elements of the heat-coil by a heat-susceptible material, the said axis being suitably supported in a fixed position. I provide a member encircling the heat-coil which is adapted to tighten around the latter when a force is applied in one direction, and thereby grip the heat-coil and tend to turn same, and which is adapted to loosen its hold on the heat-coil when a force is applied in the opposite direction, and thereby turn upon the latter to any required position. I provide a circuit-controlling means adapted to engage the encircling member and by such engagement normally tend to turn the heat-coil upon its axis, and thereby tighten the said encircling member therearound. I also provide means whereby when it is desired to reset the apparatus after operation the encircling member is loosened and turned upon the heat-coil to its initial operative position, where it again grips the latter to hold the apparatus in a set position. When the heat-coil operates, the circuit-controlling means turns the body of the heat-coil and the encircling member upon the axis until the circuit-controlling means is released from the heat-coil to open the circuit through same or to control any desired circuits. The body of the heat-coil is then secured to the axis in this new position by the cooling of the heat-susceptible material. After the heat-susceptible material has cooled the circuit-controlling means may be reset to its initial operative position, and by such resetting turn the encircling member upon the body of the heat-coil to its initial operative position, as stated, where it again engages the circuit-controlling means to hold same in a set position. The device being thus restored to operative position, it is evident that it may be operated again the same as originally. The cycle of operations comprising the operation and restoration of the device may be repeated again and again as many times as desired.

I will more particularly describe my invention by reference to the accompanying drawings, illustrating same, in which—

Figure 1 is a side elevation of the heat-coil of the invention and the protector-springs to coöperate therewith. Fig. 2 is an end elevation of a modified form of heat-coil. Fig. 3 is a side elevation of the heat-coil shown in Fig. 1. Fig. 4 is a longitudinal cross-sectional view of the heat-coil of Fig. 3 with the encircling member $e$ removed and certain portions shown in elevation. Fig. 5 is a detail view of the encircling member $s$ of Fig. 2, and Fig. 6 is a side elevation of a graphite or carbon protector or the like.

Like characters refer to like parts in the several figures.

The winding $w$ of heat-coil A, Fig. 4, is wound upon the hollow spool $y$, which is inclosed by an insulating-sleeve $u$ and a metallic sleeve $t$, the latter being turned over at its ends to clamp it, the sleeve $u$, and spool $y$ together. Spool $y$ is provided with a slot $y^2$ therein, through which one end of the conductor $w$ extends. The ends of $w$ are secured to sleeve $t$ and spool $y$ at $v$ and $x$, respectively. Pins $k^2 k^2$ are inserted into the hollow spool $y$ and are secured therein by an easily-fusible solder $z$ or the like. Each pin $k^2$ is provided with a flattened end portion $k$, which fits in a slot $l$ in ear $j$ of spring $a$ to hold the heat-coil from turning. The encircling member $e$, preferably a double coil-spring or any suitable member adapted to grasp the heat-coil, is threaded upon the latter and normally engaged at the portion $f$ thereof by the portion $h$ of spring $c$, which tends to rotate the heat-coil in the direction of arrow $m$. When an abnormally large current traverses the winding $w$ of the heat-coil for a short length of time, it heats the winding $w$ and spool $y$, which conducts the heat to the heat-susceptible material $z$, and thereby softens the latter, which allows the heat-coil to turn upon pins $k^2 k^2$. Spring $c$ therefore turns the heat-coil A and spring $e$ upon the pins $k^2 k^2$ to the position indicated by $f^2$, where it releases from the heat-coil and takes the position $c^2$, preferably against the ground-plate $d$. This action opens the circuit through the heat-coil and grounds the line-spring $c$. When the heat-susceptible material $z$ cools, it again solders the spool $y$ to the pins $k^2 k^2$ in a new relative position. To reset the device to operative position, spring $c$ is moved from the position $c^2$ to its normal position, the portion $i$ of spring $c$ engaging the portion $f$ of spring $e$ in the position $f^2$ and turning spring $e$ upon the heat-coil in the direction of arrow $n$ to its initial engaging position, (indicated by $f$,) the spring $e$ loosening its grasp upon the heat-coil when turned in the direction of arrow $n$ to permit of the said turning. The portion $h$ now engages the portion $f$ as originally, and thereby holds the apparatus in its initial operative position.

Instead of the coil-spring $e$ I may use a strap or band $s$, Fig. 5, encircling the heat-coil, as shown in Fig. 2, the end $s^2$ being inserted through the hole $s^4$. When a force is applied to the end $s^2$ in the direction of arrow $m$, the band $s$ tightens around the heat-coil and does not turn thereon; but when a force is applied to $s^2$ in the direction of arrow $n$ the band $s$ loosens upon the heat-coil and slips therearound.

In Fig. 6 the body portion B of the protector heats when an abnormally large current traverses same, and thereby softens the heat-susceptible material and allows the protector to turn. The spring $c$, the strap $s$, or any suitable means may be placed over the body B, as shown in Figs. 1, 2, or 3. It is not essential to hold the graphite or carbon body B against rotation as shown in Fig. 4, as there are a number of ways in which the heat-susceptible material may be applied for holding the device in a fixed position.

I do not wish to limit this invention to the particular details of construction as herein shown, as many modifications in same may be made without departing from the scope of the invention.

What I claim as new, and desire to secure by Letters Patent, is—

1. In a device of the character described, a portion operable upon excessive heating, and means encircling the operable portion and adapted to grip the latter when a force is applied in one direction and to release same when a force is applied in the opposite direction.

2. A thermal protector operable upon abnormal current conditions therein, and means adapted to grip the protector to operate same when under a force in one direction and to release the protector for resetting same when under a force in the opposite direction.

3. In a device of the character described, operable members, one adapted to grip another to both operate together when the device operates, and to release its grip to permit of a relative movement of the two members to reset the device.

4. In a thermal protector, a portion adapted to turn upon an axis under abnormal current conditions therein, a member encircling the said rotary portion and normally gripping same to turn therewith when the device operates, and means for causing the said encircling member to release its grip upon the said rotary portion and turn upon the latter to reset the device to operative position.

5. In apparatus of the class specified, a cylindrical portion operable upon abnormal current conditions, a member encircling the said cylindrical portion and normally gripping same to operate therewith, a circuit-controlling means engaging the said encircling member to operate the device under abnormal conditions to control a circuit, and means for causing the said encircling member to release its grip upon the said cylindrical portion and turn upon same to operative position to reset the apparatus.

6. In combination with a heat-coil adapted to turn upon an axis under abnormal conditions, a coil-spring encircling the heat-coil, a circuit-controlling spring adapted to engage the said coil-spring and cause same to grip the heat-coil and hold the circuit-controlling spring against operation, the latter being adapted to turn the heat-coil under abnormal conditions to control a circuit, and means adapted to engage the said coil-spring and cause same to loosen its hold upon the heat-coil and turn thereon to operative position when the apparatus is reset, substantially as described.

7. In apparatus of the class specified, a hollow spool, an axis secured within the hollow spool by a heat-susceptible material, a heat-producing winding wound upon the said spool, an insulating-sleeve inclosing the said spool, a metallic sleeve inclosing the said insulating-sleeve and securing itself, the insulating-sleeve and the said spool together, the ends of the said winding being conductively secured to the spool and metallic sleeve, respectively, the whole being adapted to turn upon the said axis when an abnormally large current in the said winding softens the heat-susceptible material, a suitable support for the said axis, a coil-spring encircling the said metallic sleeve, a circuit-controlling means adapted to engage a portion of the coil-spring and by such engagement exert a force in one direction upon the latter which causes same to grip the metallic sleeve and which also tends to operate the device against the heat-susceptible material which normally holds the device against operation, and means adapted to engage a portion of the coil-spring and by such engagement exert a force upon the latter in the opposite direction which causes same to open and release its grip on the metallic sleeve and turn thereon back to its initial operative position where the circuit-controlling means again engages it and causes same to grip the metallic sleeve to place the apparatus in condition for another operation, substantially as described.

As inventor of the foregoing I hereunto subscribe my name, in the presence of two subscribing witnesses, this 7th day of December, A. D. 1904.

FRANK B. COOK.

Witnesses:
    JNO. F. TOMPKINS,
    F. W. PARDEE.